UNITED STATES PATENT OFFICE.

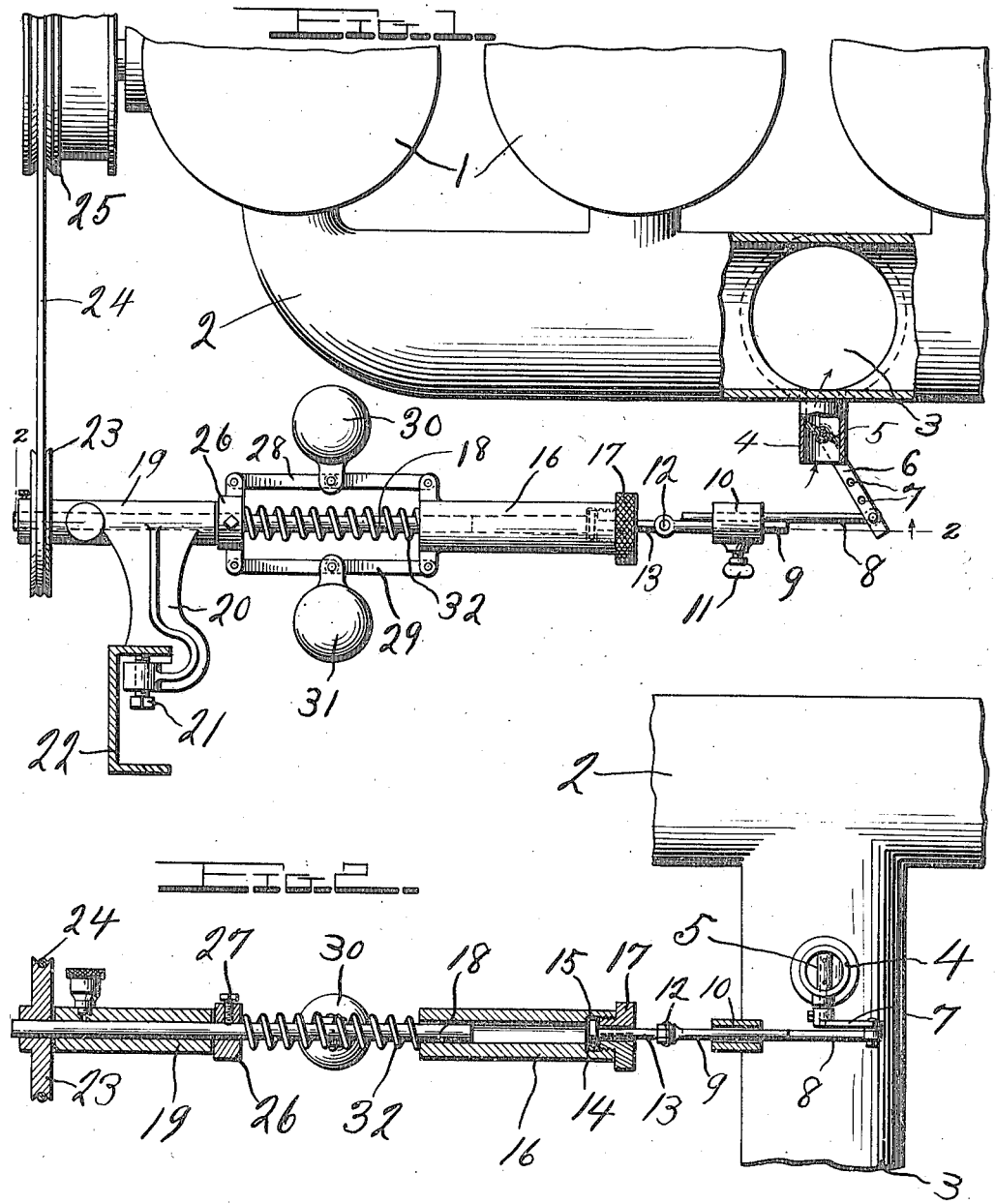

CHARLES A. RIVERS, OF EL PASO, TEXAS.

AUTOMATIC AIR DEVICE FOR GAS-ENGINES.

1,221,597.  Specification of Letters Patent.  Patented Apr. 3, 1917.

Application filed August 23, 1915. Serial No. 46,944. REISSUED

*To all whom it may concern:*

Be it known that I, CHARLES A. RIVERS, a citizen of the United States, residing at El Paso, in the county of El Paso and State of Texas, have invented certain new and useful Improvements in Automatic Air Devices for Gas-Engines; and I do hereby declare the following to be a full, clear, and exact description of the invention, such as will enable others skilled in the art to which it appertains to make and use the same.

The present invention relates to improvements in automatic air devices for gas engines, and has for an object to provide an improved device for introducing air into a trunk arranged between the intake manifold of the engine and the carbureter, and which will proportion the amount of air to correspond with the increased speed of the engine.

Another object of the present invention resides in providing a device of the above character which will be assembled on a frame adapted for removable attachment to the framework of automobiles, or the like vehicles, and the several parts whereof will be simple in construction, readily assembled, and adjustable to fit various styles of cars and valves.

Reference is had to the accompanying drawings, in which similar parts are indicated by similar reference symbols throughout the several views.

Figure 1 is a fragmentary top plan view, partly in section, of a gas engine illustrated as equipped with an automatic air device constructed in accordance with the present invention; and Fig. 2 is a fragmentary view of the intake manifold and automatic air device illustrated in section.

Referring more particularly to the drawings, 1 designates the cylinders of a gas engine, and 2 the intake manifold of the same. The intake manifold 2 is in communication with the carbureter (not shown) by a trunk 3, in which is situated an air inlet 4 under the control of a butterfly or other valve 5.

The valve 5 is connected to be actuated by an arm 6 in which is produced a series of perforations 7 for connection by one end of a rod 8 constituting, with a second rod 9, an adjustable link. The two rods 8 and 9 of the link are slidably connected together by a collar 10, provided with a clamp screw 11 for securing the rods in adjusted position. The opposite end of the rod 9 is connected, as indicated at 12, to a stem 13 which latter is provided with a head 14, more particularly seen in Fig. 2, and said head 14 is arranged to be received into a recess 15 in a sliding sleeve 16, and confined therein by a threaded plug or other suitable means 17.

The sleeve 16 is slidably mounted over one end of a shaft 18, journaled in a bearing 19 formed on a frame 20, provided with a clamp 21 for detachable connection to the framework of an automobile or other vehicle, indicated at 22. The shaft 18 is provided with a pulley or other gear element 23, over which is trained a belt 24 running over a similar pulley 25 on the crank or other shaft of the engine 1.

Between a collar 26, secured by a set screw 27 to the shaft 18, and the slidable sleeve 16 are arranged pairs of inter-connected arms 28 and 29, coupled centrally to balls or weights 30 and 31 respectively; the same constituting a centrifugal governor. On the shaft 18 is a coil spring 32, confined between the collar 26 and sliding sleeve 16 and normally operating to move the sleeve 16 into the position shown in the drawings.

In operation as the engine rotates, through the belt 24, the same will act to similarly rotate the shaft 18 carrying with the same the centrifugal governor. As the speed of the engine increases the weights or balls 30 and 31 of the centrifugal governor will draw the sliding sleeve 16 in opposition to the action of the coil spring 32 to the left as shown in the drawings, carrying with the same the rods 8 and 9 and arm 7, thereby moving the valve 5 to open position. As the speed of the engine increases this operation of the governing mechanism will continue, and the valve 5 will be opened wide to permit the engine to draw in air from the atmosphere, which will be mixed with the incoming charge and promote a more homogeneous mixture and better combustion in the engine cylinders.

When the speed of the engine falls, the spring 32 will overcome the centrifugal action of the balls 30 and 31 and will return the sleeve 16 to the right, thus closing down the valve 5 and gradually shutting off and closing communication with the atmosphere.

It will be noted that the sleeve 16 and plug 17 rotate with the governor, while the stem 13 and rods 8 and 9 are non-rotatable, but are connected to reciprocate through the head 14 which occupies the recess 15. The adjustable clamp 10 and 11 permits the rods 8 and 9 to be moved to increase or decrease the length of the link, and the perforations 7 are adapted to attach the link to the arm 7 at a proper point to secure the desired throw.

I have illustrated and described preferred and satisfactory constructions, but obviously changes could be made in the combination and arrangement of parts without departing from the spirit of my invention.

Having thus described my invention, what I claim and desire to secure by Letters Patent of the United States is:—

The combination with a pivoted valve and an arm connected thereto, of a link connected to said arm and including a pair of relatively shiftable rods, a clamp associated with said rods to hold the same in adjusted position to vary the length of the link, a headed stem connected to the other end of said link, a slidable hollow sleeve having a recess at one end thereof for receiving the head on said stem, a removable plug fitted in the end of said sleeve for confining said head in place therein, a rotary shaft having one end projecting into said hollow sleeve, means for rotating said shaft, a centrifugal governing mechanism connected between said shaft and sleeve for shifting the latter and the associated parts to rock said valve, and a spring coiled about said shaft and opposing the action of said centrifugal governor, substantially as described.

In testimony whereof, I affix my signature.

CHARLES A. RIVERS.